(12) United States Patent
Saito et al.

(10) Patent No.: US 6,979,433 B1
(45) Date of Patent: Dec. 27, 2005

(54) SYNTHESIS OF MULTI-WALL CARBON NANOTUBES USING UNSEEDED HYDROCARBON DIFFUSION FLAMES

(75) Inventors: Kozo Saito, Lexington, KY (US); Forman A. Williams, La Jolla, CA (US); Alvin S. Gordon, La Jolla, CA (US); Liming Yuan, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 375 days.

(21) Appl. No.: 10/147,780

(22) Filed: May 16, 2002

Related U.S. Application Data

(60) Provisional application No. 60/291,480, filed on May 16, 2001.

(51) Int. Cl.⁷ .................................................. D01F 9/12
(52) U.S. Cl. .................................. 423/447.1; 423/447.3
(58) Field of Search ........................... 423/447.3, 447.1

(56) References Cited

U.S. PATENT DOCUMENTS

| | | | |
|---|---|---|---|
| 5,532,613 A * | 7/1996 | Nagasawa et al. | 324/761 |
| 5,985,232 A | 11/1999 | Howard et al. | |
| 6,162,411 A | 12/2000 | Howard et al. | |
| 6,183,714 B1 | 2/2001 | Smalley et al. | |
| 6,183,854 B1 | 2/2001 | Stiller et al. | |
| 6,254,940 B1 * | 7/2001 | Pratsinis et al. | 427/562 |

* cited by examiner

*Primary Examiner*—Stuart Hendrickson
(74) *Attorney, Agent, or Firm*—King & Schickli, PLLC

(57) ABSTRACT

A method is provided for synthesizing carbon nanotubes from unseeded methane-air diffusion flames. A novel stainless steel and Ni—Cr wire probe is also provided for collecting carbon nanotubes from those diffusion flames.

15 Claims, 4 Drawing Sheets

SYNTHESIS OF MULTI-WALL CARBON NANOTUBES USING UNSEEDED HYDROCARBON DIFFUSION FLAMES

This application claims the benefit of U.S. Provisional Patent Application Ser. No. 60/291,480 filed May 16, 2001.

This invention was made with Government support under the NSF MRSEC program. The Government may have certain rights in this invention.

TECHNICAL FIELD

The present invention relates to carbon nanotubes and methods for their production.

BACKGROUND OF THE INVENTION

The first carbon nanotubes were synthesized using an arc-plasma in 1991. Since that time, carbon nanotubes have been synthesized using laser vaporization, chemical vapor deposition (CVD), electrochemical synthesis and doped acetylene diffusion flames.

U.S. Pat. Nos. 5,985,232 and 6,162,411 to Howard et al. relate to methods for synthesizing fullerenic nanostructures in laminar or diffusion flames. The methods include the combusting of various unsaturated hydrocarbon fuels with oxygen and the collecting of the fullerenic nanostructures by means of a probe inserted in the post-flame zone which includes the tail of the flame.

SUMMARY OF THE INVENTION

In accordance with the purposes of the present invention as described herein, a method of synthesizing carbon nanotubes is provided. That method comprises the steps of providing a methane-air diffusion flame and positioning a probe in a flame region of the diffusion flame wherein the probe includes a stainless steel element and a Ni—Cr carbon nanotube collecting element.

More specifically describing the invention, the providing step includes the feeding of the methane with an average linear flow rate of between about 5 and about 50 cm/s and the feeding of air with an average linear flow rate of between about 10 and about 100 cm/s. Typically, the method includes feeding the methane with an average linear flow rate of about 16.3 cm/s and feeding the air with an average linear flow rate of about 63.0 cm/s. This is followed by the producing of a steady and stable laminar flame with a visible flame height of between about 3 and about 20 cm and typically about 66 mm at atmospheric pressure.

Still further the method includes the constructing of a probe from stainless steel wire and the collecting element of the probe from Ni—Cr wire. The Ni—Cr wire may be composed of about 60% Ni, 26% Cr and 14% Fe. The stainless steel wire may comprise a mesh screen and the Ni— Cr collection wire is spaced approximately 2.0 mm from this stainless steel mesh screen. The collecting of carbon nanotubes on the Ni—Cr collecting wire is then completed for between about five and about sixty minutes.

In accordance with another aspect of the present invention the method may be performed without seeding the diffusion flame. Specifically, the method includes the positioning of the Ni—Cr collecting element in the diffusion flame at about $h/H=0.1–0.4$, where h is axial height and H is visible flame height. The probe is positioned such that carbon nanotubes are formed on the Ni—Cr collecting element in the diffusion flame in a zone of about $r/R=0.5–0.9$ on the fuel side of the diffusion flame immediately away from a flame sheet of the diffusion flame, where r is radial distance from axial height and R is flame radius. Typically, this zone is about 1.0 to about 5.0 mm on the fuel side from the flame sheet. Thus the Ni—Cr collecting element is positioned in the yellow and blue flame regions of the diffusion flame.

In accordance with yet another aspect of the present invention, a probe is provided for collecting carbon nanotubes from a hydrocarbon-air diffusion flame. That probe comprises a stainless steel element and a Ni—Cr element for collecting carbon nanotubes. The stainless steel element may be in the form of a mesh screen and the Ni—Cr carbon nanotube collecting element may be a simple wire, loop or mesh screen positioned within about 2.0 mm of the stainless steel mesh screen element.

In the following description there is shown and described several embodiments of this invention simply by way of illustration of some of the modes best suited to carry out the invention. As it will be realized, the invention is capable of other different embodiments and its several details are capable of modification in various, obvious aspects all without departing from the invention. Accordingly, the drawings and description will be regarded as illustrative in nature and not as restrictive.

BRIEF DESCRIPTION OF THE DRAWING

The accompanying drawing incorporated in and forming a part of this specification, illustrates several aspects of the present invention, and together with the description serves to explain the principles of the invention. In the drawing.

DETAILED DESCRIPTION OF THE INVENTION

The present invention relates to a method of synthesizing carbon nanotubes from a methane-air diffusion flame. Advantageously, the method is even effective in collecting carbon nanotubes from unseeded flames. That method may be broadly defined as including the steps of providing a methane-air diffusion flame and positioning a probe in the flame region of the diffusion flame.

Figure 1:
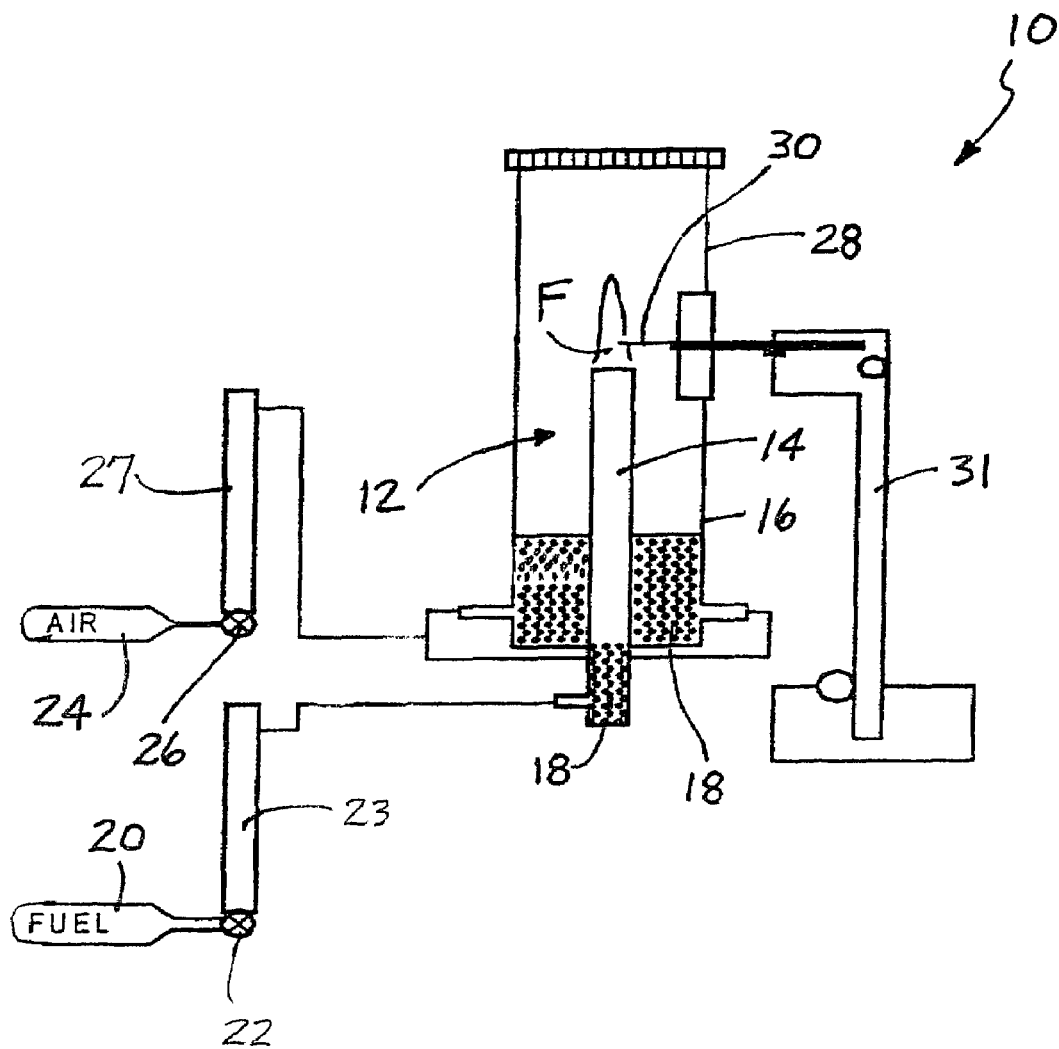
FIG. 1 is a schematical illustration of the apparatus used in the production of carbon nanotubes in accordance with the method of the present invention.

An apparatus 10 for performing the present method is illustrated in FIG. 1. That apparatus 10 includes a burner 12 having an inner tube 14 concentrically disposed within an outer tube 16. The inner tube 14 may, for example, be made from stainless steel and have a diameter of about 1.1 cm while the outer tube 16 has a diameter of about 5.0 cm.

As will be described in greater detail below, methane is fed through the inner tube 14 while air is fed through the outer tube 16. Glass beads 18 at the bottom of each tube 14, 16 help insure smooth even flow of fuel and air through the respective tubes.

More specifically, the method includes the step of feeding the methane from a fuel supply source 20 through a metering valve 22 and flow meter 23 to the inner tube 14 of the burner 12 at an average linear flow rate of between about 5 and about 50 cm/s. Simultaneously, is the feeding of air from an air supply source 24 through a metering valve 26 and flow meter 27 to the outer tube 16 of the burner 12 at an average linear flow rate of between about 10 and about 100 cm/s. This produces a steady and stable flame F with a visible flame height of between about 3 and about 20 cm at atmospheric pressure. For example, an average linear methane flow rate of about 16.3 cm/s and an average linear air flow rate of about 63 cm/s produces a steady laminar flame F with a visible flame height of about 65 mm at atmospheric pressure in the glass chimney 28.

Figure 2:
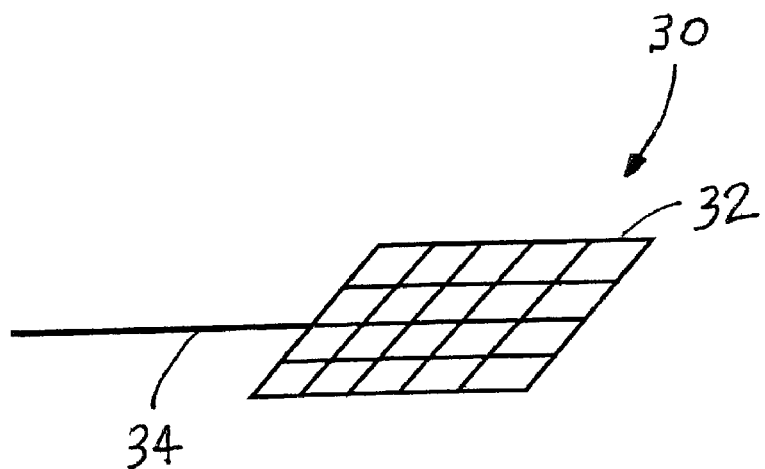
FIG. 2 is a schematical illustration of one embodiment of the probe utilized in the present method.

A probe 30 is held by an x-y positioner 31 in the flame region of the diffusion flame F to collect carbon nanotubes. As shown in FIG. 2, the probe 30 includes a stainless steel element 32 and a Ni—Cr carbon nanotube collecting element 34. As illustrated in the FIG. 2 embodiment the stainless steel element 32 is a mesh screen while the collecting element 34 is a holding wire. The mesh screen 32 is about 8 mm×5 mm for a 10 mm diameter burner 12. The Ni—Cr wire collecting element 34 is between about 0.4 and about 1.0 mm in diameter. The stainless steel mesh may, for example, have a cell size of about 1.0 mm×1.0 mm and the stainless steel mesh wire may have a diameter of about 0.3 to about 0.8 mm.

Figure 3:
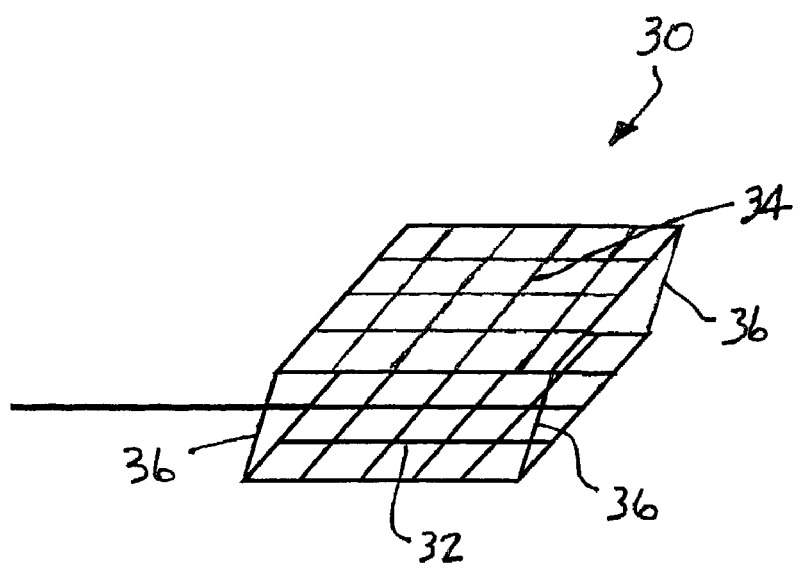
FIG. 3 is a schematical illustration of an alternative embodiment of the probe utilized in the present method.

An alternative embodiment for the probe 30 is illustrated in FIG. 3. In this embodiment, a wire plate or grid Ni—Cr collecting element 34 is positioned adjacent (within about 2.0 mm) of a stainless steel mesh screen 32 and held in place by stainless steel struts 36 at each corner. In either of the embodiments illustrated in FIGS. 2 and 3, the Ni—Cr wire used for the carbon nanotube collecting element 34 is about 60% Ni, about 26% Cr and about 14% Fe.

The collecting element 34 of the probe 30 is positioned in the flame F at about h/H=0.1–0.4. The carbon nanotubes are formed on the Ni—Cr collecting element 34 in a zone of about r/R=0.5–0.9, typically from about 1.0 to about 5.0 mm, on the fuel side of the diffusion flame immediately away from a flame sheet of the diffusion flame F, where h is the axial height, H is the visible flame height, r is the radial distance from axial height and R is the flame radius. Thus, the collecting element 34 is positioned in the yellow and blue regions of the diffusion flame F. The carbon nanotubes may be collected on the probe 30 for between about 5 and about 60 minutes.

The following example is presented to illustrate the present invention.

EXAMPLE

Methane (99.9% purity) issued from a burner having a 1.1 cm diameter stainless steel inner tube, which was surrounded by a 5 cm-diameter outer tube through which air flowed. With the average linear methane flow rate of 16.3 cm/s and the average linear air flow rate of 63 cm/s, a steady and stable laminar flame with a visible flame height of about 65 mm was established on the burner port at atmospheric pressure. A probe including a stainless steel grid as described above with a holding wire of 0.4 mm diameter bare Ni—Cr (60% Ni, 26% Cr, 14% Fe) was utilized to collect deposit materials on the grid. The Ni—Cr wire held the grid by going through the grid mesh. The wire was exposed to the flame at about the same location as the grid and materials were deposited on it. The sampling time was 15 to 30 minutes; the longer sampling time resulted in larger accumulation of deposit material, but SEM and TEM images of these deposit materials remained the same regardless of the sampling time. For SEM analysis the deposit material was coated with gold, while for TEM analysis the deposit material was dispersed in ethanol with mild sonication, and a few drops of the dispersed liquid were placed on the copper TEM grids and dried.

Figure 4:
FIG. 4 is a 10K magnified SEM image of the material deposited on the probe from a methane starting material.
Figure 5:
FIG. 5 is a 60K magnified SEM image of the material deposited on the probe from a methane starting material.
Figure 6:
FIG. 6 is a 50K magnified TEM image of the material deposited on the probe from a methane starting material.

SEM and TEM images of the Ni—Cr wire-deposited carbon nanotubes are shown in FIGS. 4 through 6. FIGS. 4 and 5 show, respectively, a 10K-magnified and a 60K-magnified SEM image of the same deposit material from methane. The scale is marked at the bottom of the figure, where there are ten divisions, each one tenth of the length printed. Bundles of string-shaped materials with no apparent spherical particles (particular characteristics of soot) are seen in FIG. 4. FIG. 5 reveals the magnified image of each string to be spaghetti-shaped with a tube-diameter range between 20 and 60 nm. FIG. 6 is a TEM image of the same deposit material collected from methane, showing not only string-like nanotubes but also particles at the end of tubes and a possibly solid carbon nanofiber of approximately 120 nm diameter.

Careful review of these TEM images revealed that every nanotube has at least one end connected to a particle. Our SEM images showed that most of the nanotubes have the particle at the bottom end next to the substrate, while some of them do have particles on the top end. This suggests that they experienced extrusion, that is, growth from the root. Although no particles for seeding were in the flame, some flame-induced particles may well be formed on the Ni—Cr wire surface. It was observed that some particles were encapsulated at the tips of some of the carbon fibers.

Our TEM-EDX (energy-dispersive X-ray) spectra showed these particles to be nickel oxides, suggesting that they may act as the particle catalyst for the nanotubes to grow. When this experiment was completed using only a Ni—Cr wire, deposited materials on the wire were soot particles, but not carbon nanotubes suggesting that the stainless steel grid either provided a catalysis source for carbon nanotube growth or changed the temperature and the flow fields.

The region in the flame where nanotube growth occurs was found to be very limited. This is part of the reason that researchers have not previously noticed that carbon nanotubes can grow from unseeded methane flames. Another reason is that the combination of a stainless steel grid and a Ni—Cr wire is required to produce carbon nanotubes. The black deposition occurred only in a 1–5 mm zone on the fuel side, immediately away from the flame sheet and at a certain height. The optimum harvest condition for carbon nanotubes in our experiment was at h/H=0.2~0.3 and r/R=0.6~0.9, where h is axial height, H is visible flame height, r is radial distance from the axial, and R is the flame radius. Note that the location of the greatest carbon-nanotube harvest is in the yellow flame region where soot particles exist. Therefore the ingredients to form carbon nanotubes and soot may be the same. The difference is that soot can be formed under a broad range of conditions, while carbon nanotubes can grow only under very limited conditions with catalyst particles present. The temperature at the position where carbon nanotubes are formed is about 1500 K.

Figure 7:
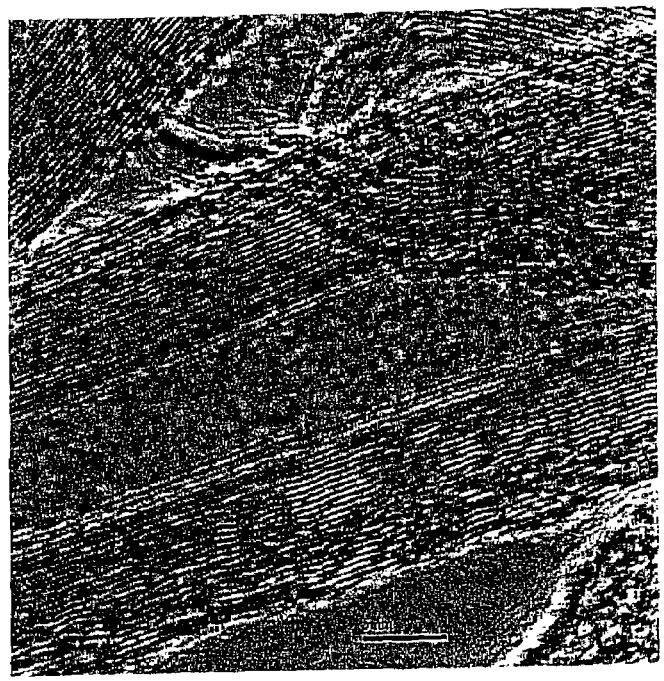
FIG. 7 is a typical high resolution TEM image of a carbon nanotube produced in accordance with the method of the present invention.

Carbon nanotubes obtained using the methane-air flame are well-graphitized as shown in FIG. 7, showing a typical high resolution TEM image of a nanotube. Straight and continuous lattice fringes parallel to the axis of the tube are observed, indicating the high quality of the carbon nanotubes formed.

In summary, numerous benefits result from employing the method of the present invention. Importantly, high quality carbon nanotubes are produced by the present method from a relatively inexpensive fuel source; methane. This substantially reduces the cost of producing carbon nanotubes. As a further advantage, the method achieves these desirable results without seeding the flame with relatively expensive catalyst materials.

Additionally, a novel probe is provided. That probe is not only useful in collecting carbon nanotubes from methane-air diffusion flames but other hydrocarbon-air diffusion flames including unseeded flames. The probe collects carbon nanotubes very efficiently and effectively and is simple to use and inexpensive to construct.

What is claimed is:

1. A method of synthesizing carbon nanotubes, comprising:
   providing a methane-air diffusion flame; and
   positioning a probe in a flame region of said diffusion flame wherein said probe includes a stainless steel element and a Ni—Cr carbon nanotube collecting element.

2. The method of claim 1, wherein said providing step includes feeding said methane with an average linear flow rate of between about 5 and about 50 cm/s and feeding said air with an average linear flow rate of between about 10 and about 100 cm/s.

3. The method of claim 1, wherein said providing step includes feeding said methane with an average linear flow rate of about 16.3 cm/s and feeding said air with an average linear flow rate of about 63.0 cm/s.

4. The method of claim 1, including producing a steady and stable laminar flame with a visible flame height of between about 3 and about 20 cm at atmospheric pressure.

5. The method of claim 1, including producing a steady and stable laminar flame with a visible flame height of about 65 mm at atmospheric pressure.

6. The method of claim 1, further including constructing said probe from stainless steel mesh and said collecting element of said probe from Ni—Cr wire.

7. The method of claim 1, further including constructing said probe from stainless steel mesh and said collecting element of said probe from Ni—Cr wire of about 60% Ni, about 26% Cr and about 14% Fe.

8. The method of claim 1, further including constructing said probe from a stainless steel mesh screen and said collecting element of said probe from a Ni—Cr collection wire.

9. The method of claim 8, including spacing said Ni—Cr collection wire approximately 2.0 mm from said stainless steel mesh screen.

10. The method of claim 1, including collecting said carbon nanotubes on said Ni—Cr collecting element for between about five and about sixty minutes.

11. The method of claim 1, including performing said method without seeding said diffusion flame.

12. The method of claim 1, including positioning said Ni—Cr collecting element into said diffusion flame at about $h/H=0.1-0.4$, where h is axial height and H is visible flame height.

13. The method of claim 1, including positioning said Ni—Cr collecting element into yellow and blue flame regions of said diffusion flame.

14. The method of claim 1, including said Ni—Cr wire diameter from 0.4 to 1 mm, stainless steel mesh cell size of 1 mm×1 mm, and stainless steel mesh wire diameter from 0.3 to 0.8 mm.

15. The method of claim 1 further including positioning of the collecting element in said diffusion flame about 1.0 to 5.0 mm on a fuel side from the flame sheet.

* * * * *